United States Patent
Kubota et al.

(10) Patent No.: US 11,181,737 B2
(45) Date of Patent: Nov. 23, 2021

(54) HEAD-UP DISPLAY DEVICE FOR DISPLAYING DISPLAY ITEMS HAVING MOVEMENT ATTRIBUTE OR FIXED ATTRIBUTE, DISPLAY CONTROL METHOD, AND CONTROL PROGRAM

(71) Applicant: Panasonic Intellectual Property Management Co., Ltd., Osaka (JP)

(72) Inventors: Kosuke Kubota, Osaka (JP); Ken'ichi Kasazumi, Osaka (JP); Masahito Ogata, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 16/319,536

(22) PCT Filed: Jul. 18, 2017

(86) PCT No.: PCT/JP2017/025863
§ 371 (c)(1),
(2) Date: Jan. 22, 2019

(87) PCT Pub. No.: WO2018/025624
PCT Pub. Date: Feb. 8, 2018

(65) Prior Publication Data
US 2020/0012097 A1 Jan. 9, 2020

(30) Foreign Application Priority Data
Aug. 5, 2016 (JP) .............................. JP2016-154772

(51) Int. Cl.
*G02B 27/01* (2006.01)

(52) U.S. Cl.
CPC ...... *G02B 27/01* (2013.01); *B60K 2370/1529* (2019.05); *B60K 2370/166* (2019.05);
(Continued)

(58) Field of Classification Search
CPC ................ G02B 27/01; G02B 27/0179; G02B 2027/0138; G02B 2027/014;
(Continued)

(56) References Cited

U.S. PATENT DOCUMENTS

2008/0319664 A1\* 12/2008 Kremin ................ G01C 21/005
701/469
2009/0160736 A1 6/2009 Shikita
(Continued)

FOREIGN PATENT DOCUMENTS

JP 3-048716 3/1991
JP 2003-063275 3/2003
(Continued)

OTHER PUBLICATIONS

International Search Report of PCT application No. PCT/JP2017/025863 dated Sep. 19, 2017.
(Continued)

*Primary Examiner* — Keith L Crawley
(74) *Attorney, Agent, or Firm* — Greenblum & Bernstein, P.L.C.

(57) ABSTRACT

A HUD device that allows an occupant of a moving body to view a virtual image by projecting an image on a display medium includes a display item information acquisition unit that acquires display item information showing position and display content of display item, a travel information acquisition unit that acquires travel information indicating position of the moving body at predetermined time intervals, and a state information acquisition unit that acquires state information indicating state of the moving body, and specifies at
(Continued)

display timings display position on the basis of position indicated by display item information and position indicated by travel information acquired last. The HUD device includes a display controller that specifies display position on the basis of position indicated by display item information and correction position obtained by correcting position indicated by travel information acquired last in accordance with state indicated by state information and displays an image showing display content indicated by display item information at the specified display position on the display medium when a predetermined condition is satisfied.

15 Claims, 6 Drawing Sheets

(52) U.S. Cl.
CPC .. *B60K 2370/177* (2019.05); *G02B 2027/014* (2013.01); *G02B 2027/0183* (2013.01); *G02B 2027/0187* (2013.01)

(58) Field of Classification Search
CPC .... G02B 2027/0141; G02B 2027/0167; G02B 2027/0181; G02B 2027/0183; G09G 2380/10; G06K 9/00791; G06K 9/00798; G06K 9/00805; B60K 2370/1529; B60K 2370/16; B60K 2370/162; B60K 2370/166; B60K 2370/167; B60K 2370/175; B60K 2370/177; B60K 2370/178; B60K 2370/179; B60K 2370/193; B60K 2370/194; G01C 21/00; G01C 21/005; G01C 21/10; G01C 21/14
See application file for complete search history.

(56) References Cited

U.S. PATENT DOCUMENTS

| | | | |
|---|---|---|---|
| 2010/0004856 A1 | 1/2010 | Kobori et al. | |
| 2010/0057360 A1* | 3/2010 | Ohkubo | G01P 3/00 701/500 |
| 2010/0253918 A1* | 10/2010 | Seder | G08G 1/165 353/13 |
| 2010/0292886 A1* | 11/2010 | Szczerba | G01S 13/723 701/31.4 |
| 2012/0050138 A1 | 3/2012 | Sato et al. | |
| 2013/0282274 A1* | 10/2013 | Hernando | G01C 22/025 701/472 |
| 2015/0054638 A1* | 2/2015 | Ogawa | G08G 1/167 340/439 |
| 2015/0070158 A1 | 3/2015 | Hayasaka | |
| 2015/0153184 A1* | 6/2015 | Mudalige | G06K 9/2054 701/523 |
| 2015/0369923 A1* | 12/2015 | Morin | G01C 21/28 701/472 |
| 2016/0153801 A1* | 6/2016 | Cho | G06T 7/80 701/431 |
| 2016/0216521 A1* | 7/2016 | Yachida | G02B 27/0179 |
| 2017/0038595 A1* | 2/2017 | Kutomi | G09G 5/38 |
| 2017/0336627 A1* | 11/2017 | Ieda | G02B 27/0101 |

FOREIGN PATENT DOCUMENTS

| | | |
|---|---|---|
| JP | 2009-150947 | 7/2009 |
| JP | 2010-256878 | 11/2010 |
| JP | 2011-123119 | 6/2011 |
| JP | 2015-048040 | 3/2015 |
| JP | 2016-084020 | 5/2016 |
| WO | 2007/148546 | 12/2007 |

OTHER PUBLICATIONS

Notice of Reasons for Refusal in Japan dated Mar. 3, 2020 for the related Japanese Patent Application No. 2016-154772.

* cited by examiner

FIG. 5

Display item information

| Item ID | Attribute | Display content | Position |
|---|---|---|---|
| 01 | Movement | Right turn mark | Intersection position (x1,y1,z1) |
| 02 | Movement | Pedestrian warning mark | Pedestrian detection position (x2,y2,z2) |
| ⋮ | ⋮ | ⋮ | ⋮ |
| 11 | Fixed | Speed meter information | — |
| 12 | Fixed | Rotation speed meter information | — |
| ⋮ | ⋮ | ⋮ | ⋮ |

FIG. 6

Travel information

| Vehicle position | Vehicle traveling direction |
|---|---|

FIG. 7

State information

| Vehicle speed | Steering angle | Gradient | Acceleration rate | Yaw rate | ... |
|---|---|---|---|---|---|

HEAD-UP DISPLAY DEVICE FOR DISPLAYING DISPLAY ITEMS HAVING MOVEMENT ATTRIBUTE OR FIXED ATTRIBUTE, DISPLAY CONTROL METHOD, AND CONTROL PROGRAM

CROSS-REFERENCE TO RELATED APPLICATIONS

This application is a U.S. national stage application of the PCT International Application No. PCT/JP2017/025863 filed on Jul. 18, 2017, which claims the benefit of foreign priority of Japanese patent application No. 2016-154772 filed on Aug. 5, 2016, the contents all of which are incorporated herein by reference.

TECHNICAL FIELD

The present invention relates to a display control technique in a head-up display device that provides information to an occupant, etc. on a moving body such as a vehicle.

BACKGROUND ART

A display system has been known that superimposes an image such as acquired vehicle state, warning display to vehicle or pedestrian, or navigation information according to route on real scenery for display using a head-up display (HUD) for being mounted on a vehicle (see PTLs 1, 2). The HUD makes an image including navigation information or the like project on a windshield to be imaged on a front side of the windshield of a vehicle to allow a driver, etc. of the vehicle to view a virtual image due to reflection light from the windshield.

CITATION LIST

Patent Literatures

PTL 1: Unexamined Japanese Patent Publication No. 2011-123119
PTL 2: Unexamined Japanese Patent Publication No. 2009-150947

SUMMARY OF THE INVENTION

The present invention provides a head-up display device capable of display adequately to some extent even when positional information related to display item temporarily fails to be acquired. The present invention also provides a display control method of performing adequate display even when positional information related to display item temporarily fails to be acquired, and a control program (computer program) for display control processing to execute the adequate display.

A head-up display device according to an aspect of the present invention is a head-up display device that allows an occupant of a moving body to view a virtual image by projecting a display image on a display medium, and includes a display item information acquisition unit, a travel information acquisition unit, a state information acquisition unit, and a display controller. The display item information acquisition unit acquires display item information indicating position and display content related to at least one display item. The travel information acquisition unit acquires travel information indicating position of the moving body at predetermined time intervals. The state information acquisition unit acquires state information indicating state of the moving body. The display controller, at predetermined display timings, specifies display position based on position indicated by the display item information and position indicated by the travel information acquired last by the travel information acquisition unit, and displays an image showing display content indicated by the display item information at the display position on the display medium. The display controller specifies, when a predetermined condition is satisfied, the display position based on position indicated by the display item information and correction position obtained by correcting position indicated by the travel information acquired last by the travel information acquisition unit depending on state indicated by the state information acquired by the state information acquisition unit.

A display control method according to an aspect of the present invention is a display control method for allowing an occupant of a moving body to view a virtual image by projecting a display image on a display medium. The display control method according to the aspect of the present invention acquires display item information indicating position and display content related to at least one display item. The display control method further acquires travel information indicating position of the moving body at predetermined time intervals. The display control method further acquires state information indicating state of the moving body. Furthermore, the display control method, at predetermined display timings, specifies display position based on position indicated by the display item information and position indicated by the travel information acquired last in the travel information acquisition step, and displays an image showing display content indicated by the display item information at the display position on the display medium. Furthermore, when a predetermined condition is satisfied, display position is specified based on position indicated by the display item information, and correction position obtained by correcting position indicated by the travel information acquired last in accordance with state indicated by state information acquired to indicate present position of the moving body.

Furthermore, a control program according to an aspect of the present invention is a control program for causing a head-up display device equipped with a microprocessor to execute display control processing for allowing an occupant of a moving body to view a virtual image by projecting a display image on a display medium. The display control processing acquires display item information indicating position and display content related to at least one display item. The display control processing further acquires travel information indicating position of the moving body at predetermined time intervals. The display control processing further acquires state information indicating state of the moving body. Furthermore, the display control processing, at predetermined display timings, specifies display position based on position indicated by the display item information and position indicated by the travel information acquired last, and displays an image showing display content indicated by the display item information at the display position on the display medium. Furthermore, when a predetermined condition is satisfied, the display position is specified based on position indicated by the display item information, and correction position obtained by correcting position indicated by the travel information acquired last in accordance with state indicated by state information acquired.

The present invention can lead to adequate display to some extent even under a condition where position information related to display item fails to be acquired.

BRIEF DESCRIPTION OF DRAWINGS

FIG. 5 is a diagram illustrating an example of display item information used for the HUD device.

FIG. 6 is a diagram illustrating an example of travel information used for the HUD device.

FIG. 7 is a diagram illustrating an example of state information used for the HUD device.

DESCRIPTION OF EMBODIMENTS

Figure 1:
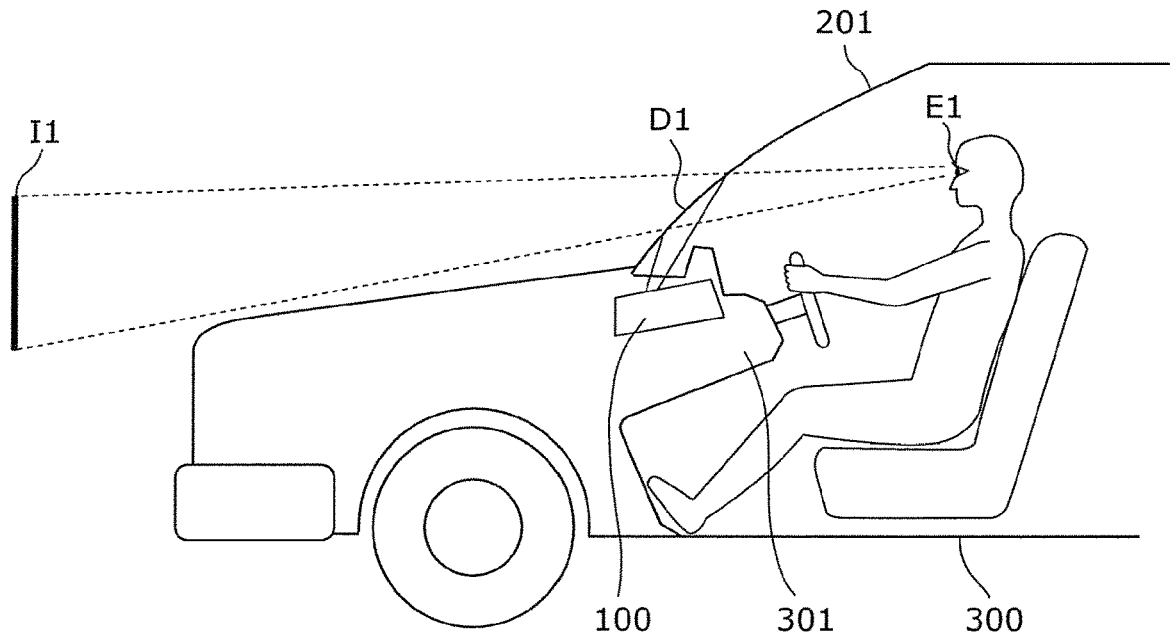
FIG. 1 is a diagram illustrating a use example of a display system including a head-up display (HUD) device according to an exemplary embodiment.

Before exemplary embodiments of the present invention are described, a problem found in a conventional system will be discussed briefly. In a conventional display system, an adequate display fails to be performed when positional information related to display item (information item that should be displayed) fails to be acquired by a sensor or the like mounted on a vehicle.

A head-up display device according to an aspect of the present invention is a head-up display device that allows an occupant of a moving body to view a virtual image by projecting a display image on a display medium, and includes a display item information acquisition unit, a travel information acquisition unit, a state information acquisition unit, and a display controller. The display item information acquisition unit acquires display item information indicating position and display content related to at least one display item. The travel information acquisition unit acquires travel information indicating position of the moving body at predetermined time intervals. The state information acquisition unit acquires state information indicating state of the moving body. The display controller, at predetermined display timings, specifies display position based on position indicated by the display item information and position indicated by the travel information acquired last by the travel information acquisition unit, and displays an image showing display content indicated by the display item information at the display position on the display medium. The display controller specifies, when a predetermined condition is satisfied, the display position based on position indicated by the display item information and correction position obtained by correcting position indicated by the travel information acquired last by the travel information acquisition unit depending on state indicated by the state information acquired by the state information acquisition unit. This makes the head-up display (HUD) device estimate position of the moving body using state of the moving body (e.g., vehicle) and specify display position of display item using the estimated position (correction position) even when information of position related to display item necessary to specify display position of display item temporarily fails to be acquired, which can lead to appropriate display for display item as long as a predetermined condition is appropriately determined to indicate condition where information of position or like related to display item fails to be acquired (e.g., condition where position of the moving body fails to be acquired, etc.).

Furthermore, for example, the display controller may determine, at one display timing, that the predetermined condition is satisfied when the travel information has failed to be acquired by the travel information acquisition unit after a previous display timing. This makes the HUD device specify display position of display item on the basis of position (correction position) of the moving body estimated using state of the moving body even when the position of the moving body temporarily fails to be acquired, which can lead to adequate display for display item.

The display item information acquisition unit may acquire the display item information at predetermined time intervals. Furthermore, the display controller may specify display position in a case where the predetermined condition is satisfied based on position indicated by display item information acquired last by the display item information acquisition unit and correction position obtained by correcting position indicated by the travel information acquired last by the travel information acquisition unit in accordance with state indicated by state information acquired by the state information acquisition unit, and display an image showing display content indicated by display item information acquired last by the display item information acquisition unit at the display position on the display medium specified in the case where the predetermined condition is satisfied. This makes the HUD device specify display position of display item on the basis of display item information acquired last (e.g., previous time, etc.) even when information for display item (display item information) temporarily fails to be acquired, which can lead to adequate display for display item.

Furthermore, the travel information may further indicate traveling direction of the moving body, the state information acquisition unit may acquire the state information at predetermined time intervals, and the display controller may specify the display position based on position indicated by the display item information and position and traveling direction indicated by the travel information acquired last by the travel information acquisition unit when the predetermined condition is not satisfied, and may specify display position based on position indicated by the display item information, and correction position and correction traveling direction obtained by correcting position and travel direction indicated by the travel information acquired last by the travel information acquisition unit in accordance with state indicated by at least state information acquired last by the state information acquisition unit when the predetermined condition is satisfied. This makes the HUD device specify display position of display item on the basis of position (correction position) and traveling direction (correction traveling direction) of the moving body estimated using state of the moving body even when the position and traveling direction of the moving body temporarily fails to be acquired, which can lead to adequate display for display item.

Furthermore, the moving body may be a vehicle, and the state information may include information of vehicle speed and steering angle of the vehicle. Furthermore, the display controller may estimate present position and traveling direction of the vehicle based on position and traveling direction indicated by the travel information acquired last by the travel information acquisition unit and the vehicle speed and the steering angle indicated by state information acquired by the state information acquisition unit, and determine the correction position and the correction traveling direction to reflect an estimation result when the predetermined condition is satisfied. Estimation of present position and traveling direction of the vehicle becomes possible to some extent by using past position and traveling direction of the vehicle and vehicle speed and steering angle of the vehicle, so that display position of display item can be adequately specified, which can lead to adequate display of display item.

Furthermore, the state information may further include information of gradient of the vehicle, and the display controller may estimate present position and traveling direction of the vehicle on the basis of gradient of the vehicle indicated by the state information. Past position and traveling direction of the vehicle and vehicle speed, steering angle, and gradient of the vehicle make it possible to estimate present position and traveling direction of the vehicle in three-dimensional space with a high accuracy, and the display position of display item can be adequately specified, which can lead to adequate display of display item.

Furthermore, display item may include one of movement attribute and fixed attribute. Furthermore, the display item information acquisition unit may acquire the display item information for display item of movement attribute, and further acquire fixed item information indicating display content for display item of fixed attribute, and the display controller may display at the predetermined display timings an image showing display content indicated by the fixed item information at predetermined display position on the display medium. This makes it possible to display image according to not only display item of movement attribute that can be moved in association with position but also display item of fixed attribute having less relation with position (e.g., measurement value of speed meter, etc.).

Furthermore, display item may include one of movement attribute and fixed attribute. Furthermore, the display item information acquisition unit may acquire the display item information for display item of movement attribute, and may further acquire, at predetermined time intervals, fixed item information indicating position and display content related to display item for display item of fixed attribute, and the display controller may specify, at the predetermined display timings, display position based on position indicated by the fixed item information acquired last by the display item information acquisition unit and position indicated by the travel information acquired last by the travel information acquisition unit, and display an image showing display content indicated by the fixed item information at the specified display position on the display medium. This makes it possible to adequately display image according to not only display item of movement attribute whose position can be moved but also display item of fixed attribute that does not move.

Furthermore, the display controller may not display the image showing display content indicated by the display item information when the display position specified is out of a predetermined region on the display medium in a case where the predetermined condition is satisfied. This limits display position according to display item within a constant viewing angle in viewing field of occupant looking front direction of the moving body, which can suppress to be displayed at position hard to see.

A display control method according to an aspect of the present invention is a display control method for allowing an occupant of a moving body to view a virtual image by projecting a display image on a display medium. The display control method according to the aspect of the present invention acquires display item information indicating position and display content related to at least one display item. The display control method further acquires travel information indicating position of the moving body at predetermined time intervals. The display control processing further acquires state information indicating state of the moving body. Furthermore, the display control method, at predetermined display timings, specifies display position based on position indicated by the display item information and position indicated by the travel information acquired last in the travel information acquisition step, and displays an image showing display content indicated by the display item information at the display position on the display medium. Furthermore, when a predetermined condition is satisfied, display position is specified based on position indicated by the display item information, and correction position obtained by correcting position indicated by the travel information acquired last in accordance with state indicated by state information acquired to indicate present position of the moving body. This, when predetermined condition is appropriately determined so as to indicate situation where position of the moving body fails to be acquired or like, estimates position of the moving body using state of moving body (e.g., vehicle) to specify display position of display item using the estimation position (correction position) even when information necessary to specify display position of display item fails to be acquired, which can lead to adequate display for display item.

A control program according to an aspect of the present invention is a control program for causing a head-up display device equipped with a microprocessor to execute display control processing for allowing an occupant of a moving body to view a virtual image by projecting a display image on a display medium. The display control processing includes a display item information acquisition step of acquiring display item information indicating position and display content related to at least one display item, and acquires travel information indicating position of the moving body at predetermined time intervals. The display control processing further acquires state information indicating state of the moving body. Furthermore, the display control processing, at predetermined display timings, specifies display position based on position indicated by the display item information and position indicated by the travel information acquired last, and displays an image showing display content indicated by the display item information at the display position on the display medium. Furthermore, when a predetermined condition is satisfied, display position is specified based on position indicated by the display item information, and correction position obtained by correcting position indicated by the travel information acquired last in accordance with state indicated by state information acquired. When the control program is installed in a HUD device equipped with a processor (micro-processor), the processor executes the control program to make the HUD device perform display control processing, which can lead to adequate display for display item.

It should be noted that those comprehensive, specific aspects may be implemented by a system, a method, an integrated circuit, a computer program, or a computer-readable recording medium such as a CD-ROM, or may be implemented by any combination of the system, the method, the integrated circuit, the computer program, or the non-temporary recording medium.

Hereinafter, exemplary embodiments of the present invention will be described with reference to the drawings. Note that the following exemplary embodiments each illustrate a comprehensive or specific example of the present invention. Numerical values, shapes, constituent elements, arrangement positions of the constituent elements, steps, and order of the steps illustrated in the following exemplary embodiments are merely examples, and therefore do not limit the present invention. Among the constituent elements in the following exemplary embodiments, constituent components not recited in the independent claims can be added as appropriate. Furthermore, each drawing is schematic, and is not necessarily illustrated precisely.

First Exemplary Embodiment

Hereinafter, a display system consists of a group of vehicle devices including head-up display (HUD) device 100 will be described with reference to the drawings as an exemplary embodiment of the present invention.

FIG. 1 is a diagram illustrating a usage example of the display system including HUD device 100.

Figure 2:
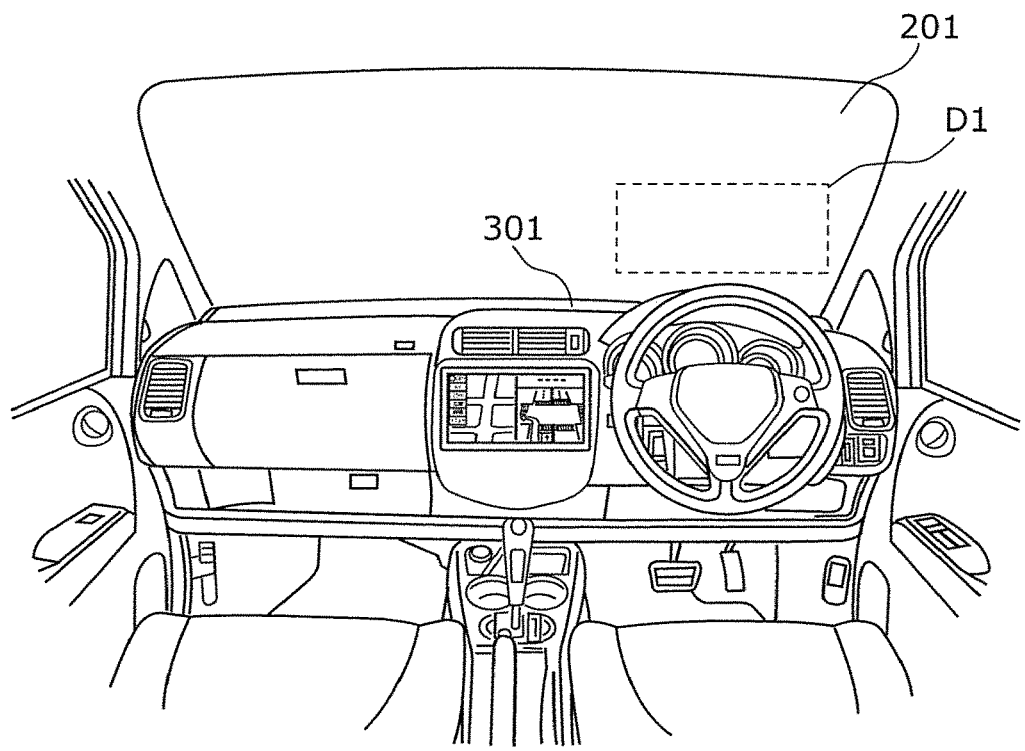
FIG. 2 is a diagram illustrating an example of a predetermined region on which an image displayed by the HUD device is projected according to the exemplary embodiment.

The display system including HUD device 100 is mounted on, for example, a moving body such as vehicle 300, and includes a HUD and the like that projects an image (display image) showing information on predetermined region D1 of a display medium such as windshield 201 to allow an occupant of the moving body having point of view E1 to view a virtual image reflecting the information. In the example of FIG. 1, HUD device 100 is installed on dashboard 301 of vehicle 300. In a visual field of the occupant having point of view E1, a virtual image is viewed so as to be reflected on virtual HUD screen I1 located in front of vehicle 300. The display system makes information as a virtual image be displayed in the visual field of the occupant so as to be overlapped with real landscape or the like. Note that, in the exemplary embodiment, although description is made using a display system applied to a vehicle that is a moving body as an example, the moving body is not limited to vehicle, and the moving body may be ship, airplane, or the like. Furthermore, in the exemplary embodiment, although an example will be described in which occupant of moving body is specifically a driver of vehicle, the occupant is not limited to driver. Note that a display range of virtual image displayed within viewing field of occupant by projection of image by the HUD (that is, maximum range in which maximum image can be displayed as virtual image) is limited within a predetermined region due to, for example, arrangement, structure, and the like of the HUD. FIG. 2 is a diagram illustrating an example of a range of predetermined region D1 of windshield 201 (display medium) on which an image displayed by HUD device 100 is projected when viewed from inside vehicle 300. Predetermined region D1 is a region corresponding to a constant angular field (constant viewing angle) in eyesight of occupant (driver) looking front side of vehicle 300.

Figure 3:
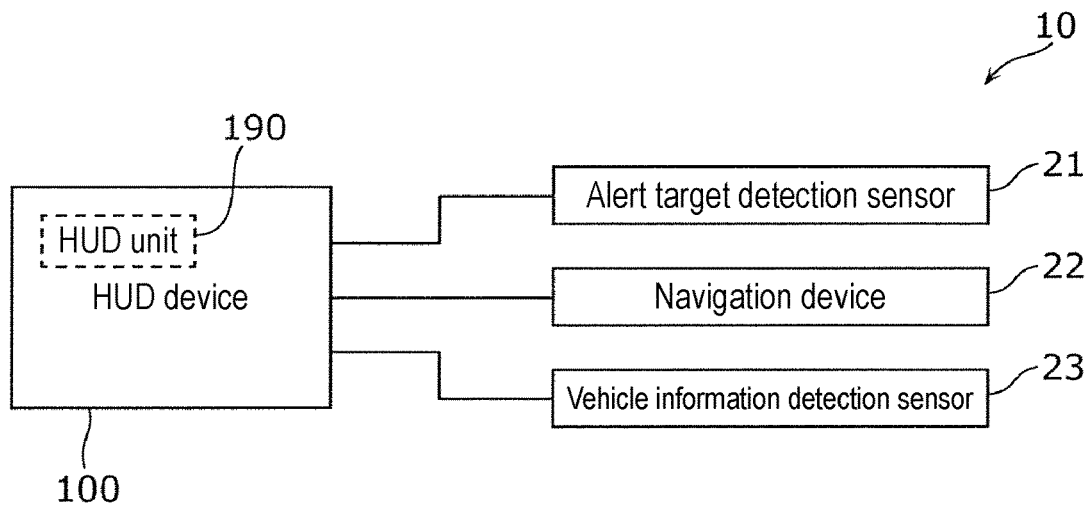
FIG. 3 is a system configuration diagram of the display system according to the exemplary embodiment.

FIG. 3 is a system configuration diagram of display system 10 as an example of the display system including HUD device 100. As illustrated in FIG. 3, display system 10 includes HUD device 100, alert target detection sensor 21, navigation device 22, and vehicle information detection sensor 23, and includes windshield 201 (display medium) although omitted in FIG. 3. Alert target detection sensor 21, navigation device 22, and vehicle information detection sensor 23 can transmits, to HUD device 100, information on predetermined display item that should be displayed on HUD screen I1 by HUD device 100.

Alert target detection sensor 21 is mounted inside or outside the vehicle, and is a sensor for sensing foreground of the driver of the vehicle at predetermined time intervals such as 1/60 second for example. Alert target detection sensor 21 may be, for example, an image sensor (camera) that detects light or the like of foreground, a radar that detects reflection of electromagnetic wave, or the like. Alert target detection sensor 21 transmits information based on a sensed result to HUD device 100. For example, alert target detection sensor 21 recognizes a predetermined target (display item) existing around the vehicle (e.g., within forward 100 m) in foreground of vehicle 300, and outputs information of content, position, and the like of each display item as a recognition result. Herein, a predetermined target that should be recognized is display item that should be displayed by the HUD, and for example, is moving body (e.g., other vehicle, pedestrian, etc.), street sign, white line on road, road marking, curb, guardrail, traffic lights, telephone pole, building, and the like. For example, when alert target detection sensor 21 is a camera, a target object (display item) is recognized by subjecting a foreground image of the vehicle that is a sensed result to image processing such as pattern matching. Furthermore, for example, when alert target detection sensor 21 is a radar, a target object (display item) is extracted for recognition using an existing technique such as clustering or machine learning with respect to information that is a sensed result. Note that, alert target detection sensor 21 may specify position of each target object (display item) by relative position with respect to vehicle 300, or may specify the position by absolute position using positioning information obtained by global positioning system (GPS).

Navigation device 22 includes a GPS receiver, and has a vehicle navigation function based on positioning information obtained by GPS and map data. Navigation device 22 may include, for example, a memory, a storage device such as a hard disc device, and a transmitting and receiving device, or the like for acquiring map data from outside by communication to store it. Navigation device 22 can measure present position of vehicle 300 using GPS and calculate traveling direction of the vehicle using the present position and position of vehicle 300 measured in the past. Furthermore, navigation device 22 recognizes a target object (display item) within 100 m in front of vehicle 300 in the traveling direction on the basis of map data, and outputs information such as content and position of each display item as recognition result. The target object that should be recognized on the basis of map data is, for example, intersection or the like. For example, as to recognized intersection, information for guiding pathway to a destination preliminarily input by the driver, etc. of vehicle 300 to navigation device 22 (e.g., right turn mark) or the like can be the content of display item.

Vehicle information detection sensor 23 includes various sensors (speed sensor, rotation speed sensor, etc.) that detect states of vehicle 300, and transmits information indicating the detected states to HUD device 100. The states of vehicle 300 are set of each state such as, for example, vehicle speed, rotation speed (rotation speed of engine, etc.) steering angle (rotation angle of steering wheel), gradient (pitch), acceleration rate, and yaw rate. Among the states detected by vehicle information detection sensor 23, for example, vehicle speed, rotation speed, or the like can be content of display item that should be displayed by HUD device 100.

HUD device 100 is a device that allows the driver of vehicle 300 to view a virtual image by displaying an image on windshield 201 (display medium), and includes HUD unit 190 that is a display mechanism as the HUD for projecting an image on windshield 201 to allow the driver of vehicle 300 to view a virtual image (image displayed on HUD screen I1). HUD device 100 further includes, for example, a computer including a memory and a processor (microprocessor), and provides various functions by controlling each unit of the HUD device 100 by executing a control program stored in the memory by the processor. Note that, the memory is a read only memory (ROM) that preliminarily keeps program and data, a random access memory (RAM) that is used to store data or the like in program execution, and the like, and may include, for example, a non-volatile memory. The control program regulates, for example, display control processing to allow the driver of vehicle 300 to recognize a virtual image by displaying an image on the display medium. By executing the control program for display control processing by the processor, HUD device 100 has a function of, for example, acquiring various items of information from alert target detection sensor 21, navigation device 22, and vehicle information detection sensor 23 and controlling display by HUD unit 190 on the basis of the information.

Figure 4:
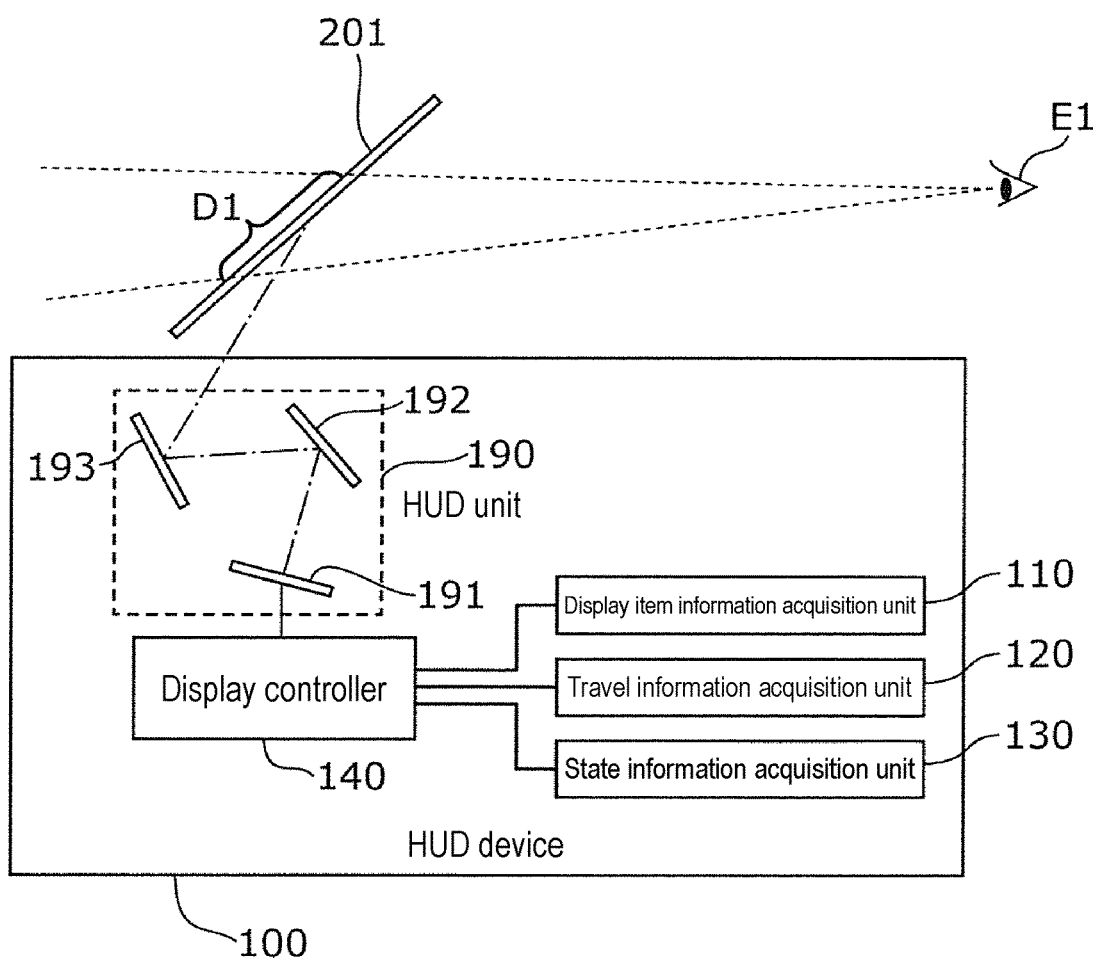
FIG. 4 is a function block diagram of the HUD device according to the exemplary embodiment.

FIG. 4 is a functional block diagram of HUD device 100. Note that, in the drawing, predetermined region D1 of windshield 201 on which light showing an image is projected from HUD unit 190, and the like are additionally illustrated.

As illustrated in FIG. 4, HUD device 100 includes HUD unit 190, display item information acquisition unit 110, travel information acquisition unit 120, state information acquisition unit 130, and display controller 140. Each function of display item information acquisition unit 110, travel information acquisition unit 120, state information acquisition unit 130, and display controller 140 is provided by making the processor execute a control program stored in the memory in HUD device 100.

Display item information acquisition unit 110 has a function of acquiring display item information indicating display item that becomes a basis of an image to be displayed on HUD screen I1 from alert target detection sensor 21, navigation device 22, and vehicle information detection sensor 23 and transmitting the display item information to display controller 140. FIG. 5 is a diagram illustrating an example of display item information. In the example in the drawing, the display item information includes information of item ID, attribute, display content, and position for each display item. Herein, item ID in the display item information is identification information for identifying a type of display item. Display content in the display item information is information for specifying an image that shows display item, and that can be different for each type of display item such as another vehicle, pedestrian, white line on road, information for guiding road, and vehicle speed, or for each situation. Position in the display item information is information indicating a position in real space related to display item. The position in real space is expressed by, for example, three-dimensional coordinates (x, y, z) or the like, any unit may be employed for unit of the coordinates, and its origin can be arbitrarily determined. Attribute in the display item information is any of movement attribute or fixed attribute. Movement attribute is an attribute indicating that position of display item is useful and its position can be changed, and fixed attribute is an attribute indicating that position as to display item does not change. Display item information as to display item of fixed attribute is specifically referred to as fixed item information. In FIG. 5, in the fixed item information, position is omitted, and an example is illustrated in which no position exists for the display item of fixed attribute or position can be ignored. In the example of FIG. 5, position in the display item information as to display item whose item ID is 01 is a position of intersection acquired from navigation device 22 that detects, for example, position of an intersection around vehicle 300 on the basis of map data, and display content therein is right turn mark for guiding pathway to a destination. Furthermore, position in display item information as to display item whose item ID is 02 is a position of pedestrian detected by alert target detection sensor 21, and display content therein is pedestrian warning mark showing a pedestrian. Display content in fixed item information as to display item whose item ID is 11 is speed meter information showing vehicle speed (e.g., 50 km/h, etc.) that can be changed detected by vehicle information detection sensor 23. Display content in fixed item information as to display item whose item ID is 12 is rotation speed meter information showing rotation speed (e.g., 2000 rpm, etc.) of engine that can be changed detected by vehicle information detection sensor 23. Note that, display item information acquisition unit 110 may acquire the display item information by generating display item information having a format as illustrated in FIG. 5 on the basis of various items of information acquired by HUD device 100 from alert target detection sensor 21, navigation device 22, and vehicle information detection sensor 23. Alternatively, alert target detection sensor 21, navigation device 22, and vehicle information detection sensor 23 may transmits display item information preliminarily arranged to have a format as illustrated in FIG. 5 to HUD device 100.

Travel information acquisition unit 120 has a function for acquiring travel information according to position and the like in real space of vehicle 300 from navigation device 22 at predetermined time intervals, and transmitting the travel information to display controller 140. FIG. 6 is a diagram illustrating an example of travel information, and the travel information includes vehicle position and vehicle traveling direction. Vehicle position in the travel information is information showing position in real space of vehicle 300. The position is expressed by, for example, three-dimensional coordinates (x, y, z) or the like, and for example, any position on the globe may be employed as its origin, and any unit can be employed for the coordinates. Vehicle traveling direction in the travel information is information indicating traveling direction in real space of vehicle 300. Position of vehicle 300 is, for example, a position measured by GPS in navigation device 22, and traveling direction of vehicle 300 is a calculated direction using present position of vehicle 300 measured, for example, by GPS in navigation device 22, and a position of vehicle 300 measured in the past. Note that, traveling direction of vehicle 300 may be specified on the basis of an azimuth sensor or the like. Travel information acquisition unit 120 may acquire traveling direction by generating travel information (see FIG. 6) on the basis of various items of information acquired by HUD device 100 from the navigation device, or navigation device 22 may transmit travel information as illustrated in FIG. 6 to HUD device 100.

State information acquisition unit 130 has a function for acquiring state information indicating state of vehicle 300 from vehicle information detection sensor 23 and transmits the state information to display controller 140. FIG. 7 is a diagram illustrating an example of the state information. The state information is a set of information such as, for example, vehicle speed (speed meter information), steering angle, gradient, acceleration rate, yaw rate, rotation speed, and the like.

HUD unit 190 projects an image on windshield 201 under control of display controller 140. HUD unit 190 includes, for example, liquid crystal display (LCD) 191, plane mirror 192, and concave mirror 193. A predetermined image (set of images that are to be projected in predetermined region D1 of windshield 201 to correspond to respective display items) formed by display controller 140 is displayed on LCD 191. The image displayed on LCD 191 is reflected by plane mirror 192, magnified by concave mirror 193, and projected (incident) on windshield 201.

Display controller 140 specifies display position on the basis of a position indicated by display item information transmitted from display item information acquisition unit 110 and position and traveling direction indicated by travel information acquired last by travel information acquisition unit 120 for each display item of movement attribute at predetermined display timings (e.g., for each 1/60 second), and displays an image showing display content indicated by the display item information at the specified display position on the display medium (windshield 201) (in detail, controls HUD unit 190 for display). Image for each display item is a display element formed by character line, sign, graphic, indicator such as image, or the like, and can be considered as a constituent element of predetermined image of one frame displayed on LCD 191. Note that display position is a position in a coordinate space for display, and differs from a position in real space. Display controller 140 displays no image showing display content for a display item when display position at which information (image) for the display item should be displayed is out of predetermined region D1 on the display medium. Furthermore, as to each display item of fixed attribute, display controller 140 displays an image showing display content indicated by fixed item information for a display item at a predetermined display position (e.g., position preliminarily determined for each item ID of fixed attribute) on the display medium (windshield 201) at predetermined display timings (e.g., for each 1/60 second). Note that, in a case of using a type of determining position in real space for display item of fixed attribute, display controller 140 specifies at predetermined display timings display position on the basis of position indicated by fixed item information acquired last by display item information acquisition unit 110 and position indicated by travel information acquired last by travel information acquisition unit 120, and displays an image showing display content indicated by the fixed item information at the specified display position on the display medium. The position indicated by fixed item information acquired last is, for example, a preliminarily determined position at which image should be displayed for each ID of display item of fixed attribute (e.g., position, etc. in real space whose origin is position of vehicle 300).

Figure 8A:
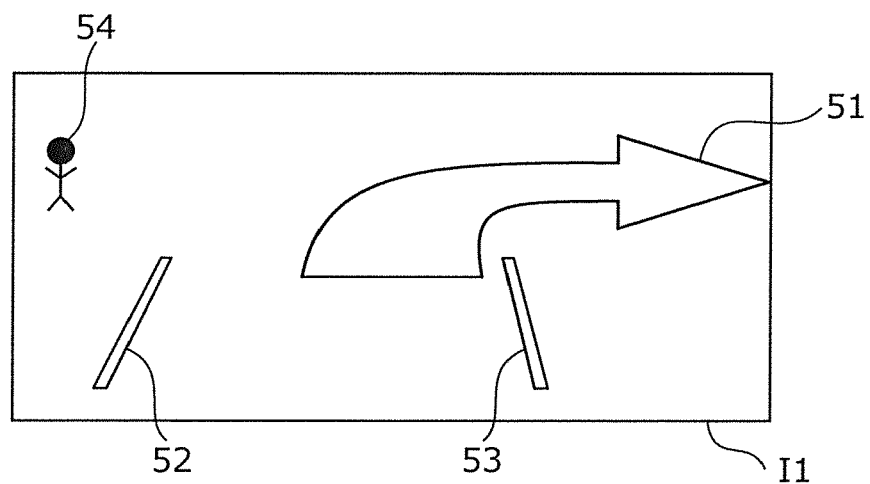
FIG. 8A is a diagram illustrating an example of an image showing display item of movement attribute displayed by the HUD device.
Figure 8B:
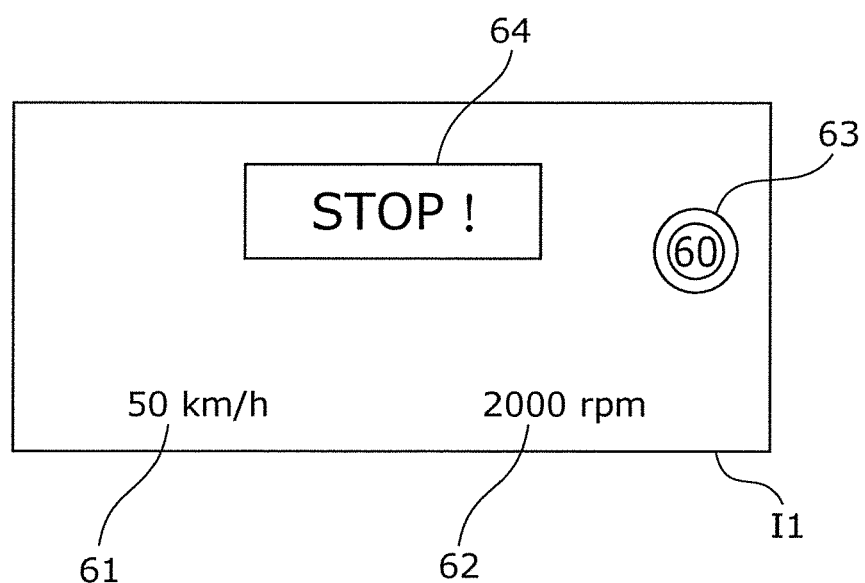
FIG. 8B is a diagram illustrating an example of an image showing display item of fixed attribute displayed by HUD device.

An example of set of images showing display contents for display items that are displayed on LCD 191 to be projected in predetermined region D1 of windshield 201 by display controller 140 will be illustrated in FIGS. 8A and 8B. FIG. 8A illustrates an example of an image showing display item of movement attribute, and in the drawing, an image of right turn mark 51 for navigation, images of respective lane marks 52, 53 showing white lines on road, and image of pedestrian warning mark 54 showing pedestrian are illustrated. Furthermore, FIG. 8B illustrates an example of image showing display item of fixed attribute, and in the drawing, an image of speed meter information 61 showing vehicle speed (50 km/h) of vehicle 300, an image of rotation speed meter information 62 showing rotation number (2000 rpm) of engine or the like, an image of speed limit mark 63 showing speed limit (60 km/h), and an image of preceding vehicle approaching alarm mark 64 showing that relative position between with front vehicle becomes less than or equal to a constant threshold value. Herein, for convenience for description, although display item of movement attribute and display item of fixed attribute are separately illustrated in the drawings, the images illustrated in respective FIG. 8A and FIG. 8B can be shown at the same time. By the display, from point of view E1 of the driver on vehicle 300 at which a reflection image (virtual image) of an image projected on predetermined region D1 is viewed, right turn mark 51, lane marks 52, 53, pedestrian warning mark 54, speed meter information 61, rotation speed meter information 62, speed limit mark 63, and preceding vehicle approaching alarm mark 64 are viewed as if they existed on HUD screen I1 at respective positions illustrated in FIG. 8A and FIG. 8B. Virtual image that is reflection image from predetermined region D1 is displayed so as to be superimposed with real landscape or the like viewed within driver's visual field.

Figure 9A:
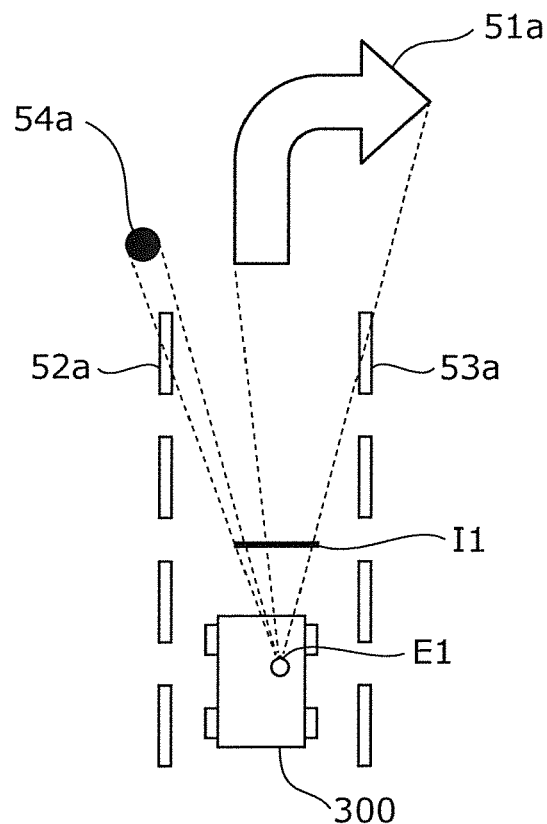
FIG. 9A is a diagram illustrating position of display item viewed from a vehicle upper direction, the display item being basis for generating an image to be displayed by the HUD device.
Figure 9B:
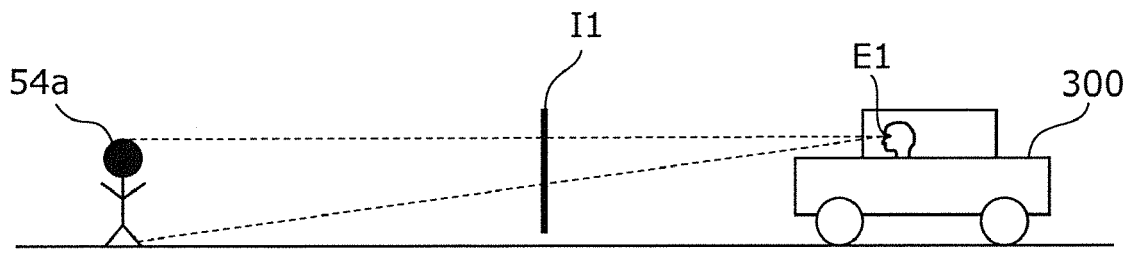
FIG. 9B is a diagram illustrating position of display item viewed from a vehicle side direction, the display item being basis for generating an image to be displayed by the HUD device.

Generation of image by display controller 140 for each display item (e.g., display item of movement attribute) corresponding to display item information indicating position will be described with reference to FIG. 9A and FIG. 9B. FIG. 9A illustrates a state where display item 51*a* indicating right turn direction around intersection position (see FIG. 5) in front of vehicle 300 in real space (within a constant viewing angle from point of view E1) should be displayed for navigation, and also illustrates a state where display items 52*a*, 53*a* which are white lines on road exist, and where display item 54*a* that is a pedestrian as a target object for display exists at a pedestrian detection position (see FIG. 5). FIG. 9A is a diagram of vehicle 300 viewed from upper direction, and FIG. 9B is a diagram of vehicle 300 viewed from side direction in same state as that in FIG. 9A. FIG. 9A and FIG. 9B show a position of virtual HUD screen I1 in front of vehicle 300. HUD screen I1 is recognized by the driver to appear at, for example, a position that is a focal point of visual line during driving (e.g., 2 m to 3 m front). Display position of display item on HUD screen I1 viewed from point of view E1 of the occupant in vehicle 300 can be calculated using position in real space of display item of movement attribute and position and traveling direction in real space of vehicle 300. Accordingly, display controller 140 can specify display position for display item on the basis of position in display item information and travel information at predetermined display timings (e.g., for each 1/60 second).

However, while vehicle 300 is traveling, there is a possibility of lack of information necessary to specify display position for display item at a display timing due to effect of state outside vehicle 300 (traveling environment) or the like. Lack of information can occur when failure in image recognition occurs due to over exposure in camera in alert target detection sensor 21 at a time of, for example, coming to bright location from a tunnel, when a pedestrian at a side of road cannot be detected by being hidden by a telephone pole or the like, when vehicle position or the like cannot be obtained due to failure in receiving positioning information in GPS receiver in navigation device 22, or the like. In a display timing, when predetermined condition is satisfied indicating lack of information necessary to specify display position for display item, display controller 140 specifies display position for the display item by using state information acquired by state information acquisition unit 130. A case where the predetermined condition is satisfied is, for example, a case where travel information fails to be acquired by travel information acquisition unit 120 after previous display timing. In this case, display controller 140 specifies display position for display item of a movement attribute on the basis of position indicated by display item information for the display item, and correction position and correction traveling direction obtained by correcting position and traveling direction indicated by travel information acquired last by travel information acquisition unit 120 in accordance with state indicated by state information acquired by state information acquisition unit 130. Correction position is, for example, estimated present position of vehicle 300, and correction traveling direction is, for example, estimated present traveling direction of vehicle 300, and correction position and correction traveling directions can be calculated (estimated) using state information such as vehicle speed, steering angle, and gradient. As to specification of display position for display item, display controller 140 can also use position acquired last hitherto in a case where position in real space for display item fails to be acquired at a display timing. That is, display controller 140 specifies display position of display item in case where a predetermined condition is satisfied, based on position in real space indicated by display item information acquired last by display item information acquisition unit 110 at a display timing, and correction position and correction traveling direction obtained by correcting position and traveling direction indicated by travel information acquired last by travel information acquisition unit 120 in accordance with state indicated by state information acquired by state information acquisition unit 130. Then, display controller 140 can display an image showing display content indicated by display item information acquired last by display item information acquisition unit 110 at the specified display position on the display medium.

Next, an operation example of display system 10 according to the exemplary embodiment will be described mainly by display control processing in HUD device 100.

In display system 10, each of alert target detection sensor 21, navigation device 22, and vehicle information detection sensor 23 transmits various items of information to HUD device 100 on the basis of a sensed result and the like, for example, at predetermined display timings (e.g., for each ⅙₀ second).

Figure 10:
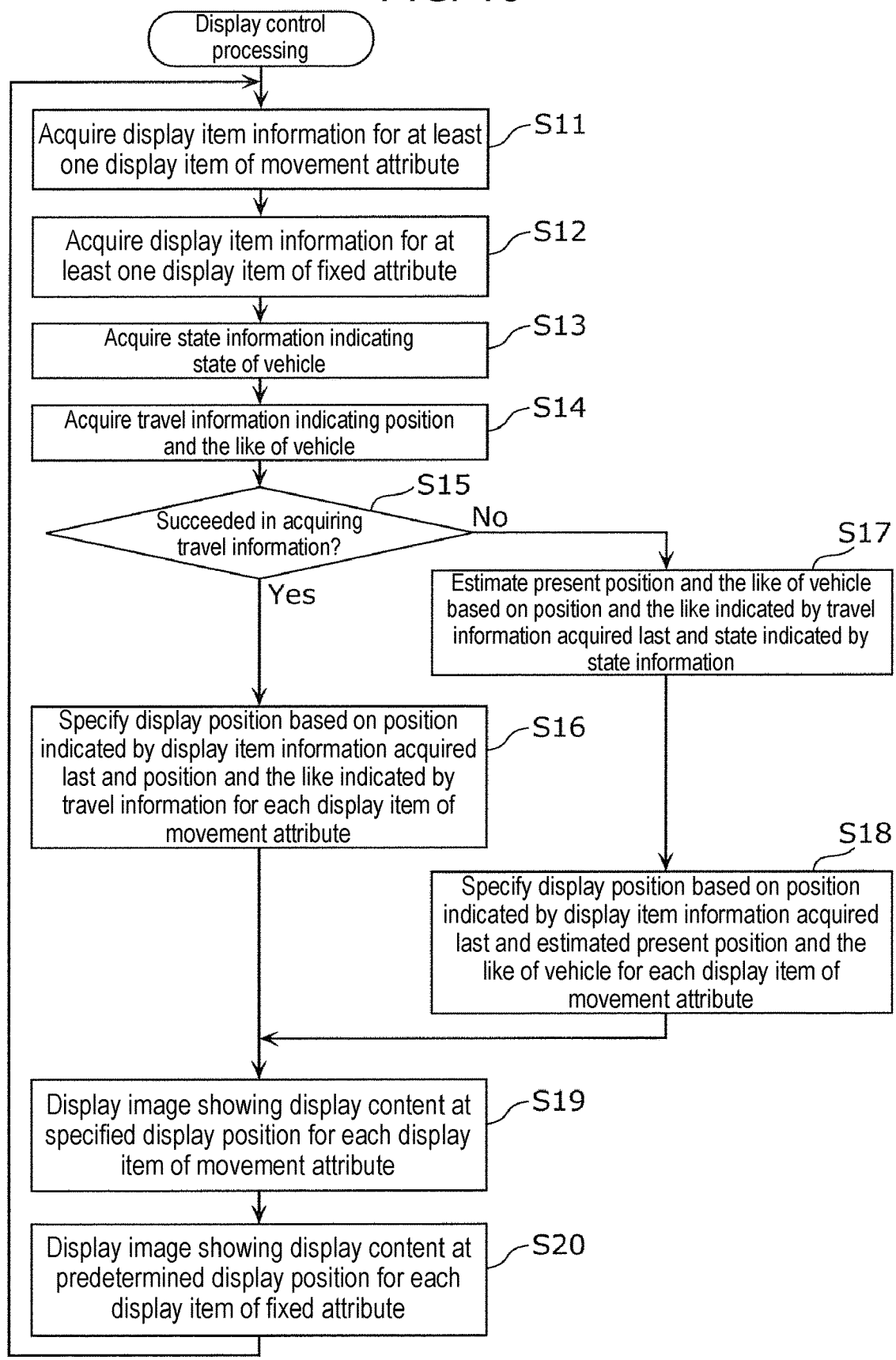
FIG. 10 is a flowchart illustrating an example of display control processing in the HUD device according to the exemplary embodiment.

FIG. 10 is a flowchart illustrating display control processing by HUD device 100. Hereinafter, display control processing will be described with reference to FIG. 10. Herein, an example will be described in which position in real space is ignored for display item of fixed attribute. In the display control processing, steps S11 to S20 are performed at a cycle of predetermined display timings (e.g., ⅙₀ second). The cycle corresponds to, for example, frame rate at which a predetermined image is supplied to LCD 191 by the processor of HUD device 100.

First, display item information acquisition unit 110 in HUD device 100 acquires display item information indicating position in real space and display content related to not less than one display item of movement attribute, and transmits the display item information to display controller 140 (step S11). Note that, in step S11, there is a case in that display item information fails to be acquired depending on a situation outside vehicle 300, or the like.

Display item information acquisition unit 110 also acquires fixed item information indicating display content related to not less than one display item of fixed attribute, and transmits the fixed item information to display controller 140 (step S12).

Also, state information acquisition unit 130 in HUD device 100 acquires state information indicating state of vehicle 300 on the basis of information detected by vehicle information detection sensor 23, and transmits the state information to display controller 140 (step S13).

Also, travel information acquisition unit 120 in HUD device 100 acquires travel information indicating position in real space and traveling direction of vehicle 300 from navigation device 22 or the like, and transmits the travel information to display controller 140 (step S14). Note that, in step S14, there is a case in that travel information fails to be acquired depending on a situation outside vehicle 300, or the like.

Then, display controller 140 in HUD device 100 determines whether travel information has successfully acquired in step S14, and if succeeded, the processing proceeds to step S16, and if failed, the processing proceeds to step S17.

In step S16, display controller 140 specifies display position on display medium on the basis of position in real space indicated by display item information acquired last and position indicated by travel information acquired in step S14 as to each display item of movement attribute.

In contrast, in step S17, display controller 140 estimates present position and present traveling direction of vehicle 300 on the basis of position and traveling direction indicated by travel information acquired last and state (vehicle speed, steering angle, gradient, etc.) indicated by state information. The estimated present position and present traveling direction is correction position and correction traveling direction obtained by correcting position and traveling direction indicated by travel information acquired last in accordance with state indicated by state information. Subsequent to step S17, display controller 140 specifies display position on display medium on the basis of position in real space indicated by display item information acquired last and present position (correction position) and present traveling direction (correction traveling direction) of vehicle 300 estimated in step S17 for each display item of movement attribute (step S18).

Subsequent to step S16 or S18, display controller 140 controls an image showing display content indicated by display item information acquired last to be displayed at display position specified in step S16 or step S18 for each display item of movement attribute (step S19).

Next, display controller 140 controls an image showing display content indicated by fixed item information to be displayed at a predetermined display position (e.g., preliminarily determined position for each ID, etc.) for each display item of fixed attribute (step S20). An image of one frame in which images (display elements) corresponding to respective display items of movement attribute and fixed attribute are arranged at respective display positions is to be displayed on LCD 191 by control in step S19 and step S20. Then, HUD device 100 projects the image displayed on LCD 191 (makes the image incident) on windshield 201 in HUD unit 190. After step S20, display controller 140 makes the processing return to step S11 again, and repeats the processing of steps S11 to S20.

Other Exemplary Embodiments, Etc

As described above, the first exemplary embodiment is used as an example of the technique according to the present invention. However, the above-mentioned exemplary embodiment is only an example, and it goes without saying that various modifications, addition, omission, and the like are possible.

Configuration, method of display, and the like of HUD unit 190 illustrated in the above-mentioned exemplary embodiment are not limited to those illustrated in FIG. 4, and any existing technique related to HUD may be applied for modification. For example, a laser projector, a liquid crystal on silicon (LCOS), or the like may be used instead of LCD 191, and a lens may be used instead of a mirror. The number of mirrors or the like may be any number. An angle of concave mirror 193 or the like can be adjusted by drive of a motor or the like depending on height of point of view E1 of the driver.

Furthermore, display item information (see FIG. 5), travel information (see FIG. 6), and state information (see FIG. 7) illustrated in the above-mentioned exemplary embodiment are only examples, and another information element may be added and some of the information elements may be omitted. For example, any travel information may be employed as long as it includes at least position of vehicle 300. Furthermore, state information may include, for example, only vehicle speed and steering angle, may include gradient with them, or can include information on any number of states. Note that, in a timing at which present position of vehicle 300 fails to be detected, estimation of present position of vehicle 300 is possible with a high accuracy to some extent when, for example, vehicle speed and steering angle can be detected, and estimation of position (coordinate) in vertical direction may be possible with more high accuracy when gradient can be further detected. Furthermore, as information element of display item information, size of display item may be added besides position or the like of display item (target object). In this case, it is sufficient that alert target detection sensor 21 detects not only position of target object (display item) but also size thereof, and transmits the size to HUD device 100. Then, in HUD device 100, for example, size of display item may be reflected in an image indicating display content in display controller 140.

In the above-mentioned exemplary embodiment, although HUD unit 190 projects an image on windshield 201, an image may be projected on a combiner that is a half mirror provided separately from windshield 201. HUD unit 190 may display an image on a transmission type display provided inside or on a surface of windshield 201.

Execution order of procedure of display control processing (see FIG. 10) in the above-mentioned HUD device 100 is not necessarily limited to the above-mentioned order, and execution order may be changed, or some of the procedure may be omitted within a range that does not depart from the gist of the present invention. Furthermore, all or some of the procedure of the above-mentioned display control processing may be provided by hardware, or may be provided by software. Note that processing by software is provided by a processor included in a computer or the like that execute a control program for display control processing stored in a memory. Alternatively, the control program may be recorded in a recording medium to distribute or circulate it. For example, making a control program distributed be installed in a device having a processor to make the processor of the device execute the control program makes it possible to make the device execute all or some of display control processing.

All or some of the procedure of display control processing may be dispersedly provided in a plurality of systems. At least some of functions of the procedure of display control processing may be provided by cloud (cloud computing), for example.

Although a computer in the above-mentioned HUD device 100 is not necessarily indispensable, HUD device 100 may include an input device such as a touch pad, an output device such as a display or a speaker, a storage device such as a hard disc device or a solid state drive (SSD), a reading device that reads out information from a recording medium such as a digital versatile disc read only memory (DVD-ROM) or a universal serial bus (USB) memory, or a transmitter-receiver that performs communication via network. For example, when the above-mentioned control program is recorded in a recording medium such as a USB memory, the reading device reads out the control program and makes the control program be stored in a memory or another storage device. The transmitter-receiver may perform communication with an external server device storing the control program via a network to make the control program be downloaded from the server device to store it in a memory or another recording device. Note that all or some of parts other than HUD unit 190 of HUD device 100 may be formed as an integrated circuit.

One aspect of the present invention may be, for example, a display control method including all or some of the procedure illustrated in FIG. 10 or the like. The display control method is a display control method for allowing an occupant of a moving body (vehicle 300, etc.) to view a virtual image by displaying an image on a display medium. The display control method includes display item information acquisition step of acquiring display item information indicating position and display content related to display item (e.g., step S11), travel information acquisition step of acquiring travel information indicating position of moving body at predetermined time intervals (e.g., step S14), state information acquisition step of acquiring state information indicating state of moving body (e.g., step S13), and display control step of specifying, at predetermined display timings, display position on the basis of position indicated by display item information and position indicated by travel information acquired last in the travel information acquisition step and displaying an image showing display content indicated by the display item information at the display position specified on display medium (e.g., steps S16, S19). In the display control step, when a predetermined condition is satisfied, display position is specified on the basis of position indicated by display item information, and correction position obtained by correcting position indicated by travel information acquired last in the travel information acquisition step in accordance with state indicated by state information acquired in the state information acquisition step to indicate present position of the moving body (e.g., steps S17, S18).

Furthermore, an aspect implemented by any combination of the above-mentioned constituent components and the functions is also included in the scope of the present invention.

INDUSTRIAL APPLICABILITY

The present invention can be applied to a display control device, a head-up display device, and the like for controlling display of information provided to an occupant of a moving body such as a vehicle.

REFERENCE MARKS IN THE DRAWINGS 10 display system
21 alert target detection sensor
22 navigation device
23 vehicle information detection sensor
51 right turn mark
52, 53 lane mark
54 pedestrian warning mark
51a, 52a, 53a, 54a display item
61 speed meter information
62 rotation speed meter information
63 speed limit mark
64 preceding vehicle approaching alarm mark
100 head-up display device (HUD device)
110 display item information acquisition unit
120 travel information acquisition unit
130 state information acquisition unit
140 display controller
190 HUD unit
191 liquid crystal display (LCD)
192 plane mirror
193 concave mirror
201 windshield
300 vehicle
301 dashboard
D1 predetermined region
E1 point of view
I1 HUD screen

What is claimed is:

1. A head-up display device that allows an occupant of a moving body to view a virtual image by projecting a display image on a display medium, the head-up display device comprising:
a processor; and
a memory including at least one set of instructions that, when executed by the processor, causes the processor to perform operations including:
acquiring display item information indicating a position and a display content for display on the display medium related to at least one display item having a movement attribute indicating that the position of the display item is changeable relative to the moving body, and further acquiring fixed item information indicating a display content for display on the display medium related to at least one display item having a fixed attribute indicating that the position of the display item is not changeable;
acquiring travel information indicating a position of the moving body at predetermined time intervals;
acquiring state information indicating a state of the moving body; and
displaying an image based on the display item information and the fixed item information,
wherein the processor changes how to specify, in response to determining whether the travel information has been acquired by the processor, a movement display position which is a display position of the display content related to the display item of the movement attribute and a fixed display position which is a predetermined display position related to the display item of the fixed attribute,
wherein, at predetermined display timings, when the travel information has been acquired by the processor, the processor:
specifies the movement display position of the display content related to the display item of the movement attribute, based on the position indicated by the display item information and the position indicated by the travel information acquired last by the processor, and displays an image showing the display content indicated by the display item information at the movement display position on the display medium, and
further specifies the predetermined display position of the display content related to the display item having the fixed attribute as the fixed display position, and displays an image showing the display content indicated by the fixed item information at the fixed display position on the display medium, and
wherein, when the travel information has failed to be acquired by the processor after a previous display timing, the processor:
specifies the movement display position of the display content related to the display item of the movement attribute by a correcting processing, the correcting processing being based on:
(i) the position of the display item having the movement attribute indicated by the display item information acquired last by the processor; and
(ii) a correction position of the moving body obtained by correcting the position of the moving body indicated by the travel information acquired last by the processor, the correcting being performed in accordance with the state indicated by the state information of the moving body acquired by the processor; and
further specifies the predetermined display position of the display content related to the display item having the fixed attribute as the fixed display position without the correcting processing.

2. The head-up display device according to claim 1, wherein
the processor:
acquires the display item information at predetermined time intervals, and
specifies, when the travel information has failed to be acquired by the processor after the previous display timing, the display position based on (i) the position of the display item having the movement attribute indicated by the display item information acquired last by the processor; and (ii) the correction position of the moving body obtained by correcting the position of the moving body indicated by the travel information acquired last by the processor, the correcting being performed in accordance with the state indicated by the state information of the moving body acquired by the processor, and
displays an image showing the display content related to the display item of the movement attribute indicated by the display item information acquired last by the processor at the display position on the display medium specified when the travel information has failed to be acquired by the processor after the previous display timing.

3. The head-up display device according to claim 1, wherein
the travel information further indicates a traveling direction of the moving body,
the processor acquires the state information at predetermined time intervals, and
when the travel information has succeeded to be acquired by the processor after the previous display timing, the processor specifies the display position of the display content related to the display item of the movement attribute based on (i) the position of the display item having the movement attribute indicated by the display item information and (ii) the position and the traveling direction of the moving body indicated by the travel information acquired last by the processor, and
when the travel information has failed to be acquired by the processor after a previous display timing, the processor specifies the display position of the display content related to the display item of the movement attribute based on (i) the position of the display item having the movement attribute indicated by the display item information acquired last by the processor, and (ii) the correction position and a correction traveling direction of the moving body obtained by correcting the position and the traveling direction of the moving body indicated by the travel information acquired last by the processor, the correcting being performed in accordance with the state indicated by at least state information of the moving body acquired last by the processor.

4. The head-up display device according to claim 3, wherein
the moving body is a vehicle,
the state information includes information of a vehicle speed and a steering angle of the vehicle, and
when the travel information has failed to be acquired by the processor after a previous display timing, the processor estimates a present position and a present traveling direction of the vehicle based on (i) the position and the traveling direction of the vehicle indicated by the travel information acquired last by the processor and (ii) the vehicle speed and the steering angle indicated by state information acquired by the processor, and determines the correction position and the correction traveling direction of the vehicle to reflect a result of the estimation.

5. The head-up display device according to claim 4, wherein
the state information further includes information of a gradient of the vehicle, and
the processor estimates a present position and a present traveling direction of the vehicle based on the gradient of the vehicle indicated by the state information.

6. The head-up display device according to claim 1, wherein
the processor does not display the image showing the display content related to the display item of the movement attribute when the travel information has failed to be acquired by the processor after a previous display timing and the display position specified is out of a predetermined region on the display medium.

7. A display control method for allowing an occupant of a moving body to view a virtual image by projecting a display image on a display medium, the display control method comprising:

a processor; and
a memory including at least one set of instructions that, when executed by the processor, causes the processor to perform operations including:
acquiring display item information indicating a position and a display content for display on the display medium related to at least one display item having a movement attribute indicating that the position of the display item is changeable relative to the moving body, and further acquiring fixed item information indicating a display content for display on the display medium related to at least one display item having a fixed attribute indicating that the position of the display item is not changeable;
acquiring travel information indicating a position of the moving body at predetermined time intervals;
acquiring state information indicating a state of the moving body; and
displaying an image based on the display item information and the fixed item information,
wherein the processor changes how to specify, in response to determining whether the travel information has been acquired by the processor, a movement display position which is a display position of the display content related to the display item of the movement attribute and a fixed display position which is a predetermined display position related to the display item of the fixed attribute,
wherein, at predetermined display timings, when the travel information has been acquired by the processor, the processor performs further operations including:
specifying the movement display position of the display content related to the display item having the movement attribute, based on the position indicated by the display item information and the position indicated by the travel information acquired last, and displaying an image showing the display content indicated by the display item information at the movement display position on the display medium, and
further specifying the predetermined display position of the display content related to the display item having the fixed attribute as the fixed display position, and displaying an image showing the display content indicated by the fixed item information at the fixed display position on the display medium, and
wherein when the travel information has failed to be acquired by the processor after a previous display timing, the movement display position on the display medium of the display content related to the display item having the movement attribute is specified by a correcting processing, the correcting processing being based on:
(i) the position of the display item having the movement attribute indicated by the display item information acquired last by the processor; and
(ii) a correction position of the moving body obtained by correcting the position of the moving body indicated by the travel information acquired last during the travel information acquisition, the correcting being performed depending on the state indicated by the state information of the moving body acquired during the state information acquisition to indicate a present position of the moving body, and
the predetermined display position on the display medium of the display content related to the display item having the fixed attribute is specified as the fixed display position without the correcting processing.

8. The head-up display device according to claim 1, wherein
the display item having the movement attribute is at least one of right/left turn mark for guiding pathway to a destination or pedestrian warning mark showing a pedestrian, and
the display item having the fixed attribute is at least one of speed meter information showing vehicle speed or rotation speed meter information showing rotation speed of engine.

9. A head-up display device that allows an occupant of a moving body to view a virtual image by projecting a display image on a display medium, the head-up display device comprising:
a processor; and
a memory including at least one set of instructions that, when executed by the processor, causes the processor to perform operations including:
acquiring display item information indicating a position and a display content for display on the display medium related to at least one display item having a movement attribute indicating that the position of the display item is changeable relative to the moving body, and further acquiring fixed item information indicating a display content for display on the display medium related to at least one display item having a fixed attribute indicating that the position of the display item is not changeable;
acquiring travel information indicating a position of the moving body at predetermined time intervals;
acquiring state information indicating a state of the moving body; and
displaying an image based on the display item information and the fixed item information,
wherein the processor changes how to specify, in response to determining whether the travel information has been acquired by the processor, a movement display position which is a display position of the display content related to the display item of the movement attribute and a fixed display position which is a predetermined display position related to the display item of the fixed attribute,
wherein, at predetermined display timings, when the travel information has been acquired by the processor, the processor:
specifies the movement display position of the display content related to the display item having the movement attribute, based on the position indicated by the display item information and the position indicated by the travel information acquired last by the processor, and displays an image showing the display content indicated by the display item information at the movement display position on the display medium,
specifies the fixed display position of the display content related to the display item having the fixed attribute, based on the position indicated by the fixed item information acquired last by the processor and the position indicated by the travel information acquired last by the processor, and displays an image showing the display content indicated by the fixed item information at the fixed display position on the display medium, wherein, when the travel information has failed to be acquired by the processor after a previous display timing, the processor:
specifies the movement display position on the display medium of the display item having the movement attribute by a correcting processing, the correcting processing being based on:
(i) the position of the display item having the movement attribute indicated by the display item information acquired last by the processor; and
(ii) a correction position of the moving body obtained by correcting the position of the moving body indicated by the travel information acquired last by the processor, the correcting being performed in accordance with the state indicated by the state information of the moving body acquired by the processor; and
further specifies the fixed display position on the display medium of the display content related to the display item having the fixed attribute without the correcting processing based on the position indicated by the fixed item information and the position indicated by the travel information acquired last when the travel information succeeded in being acquired by the processor after the previous display timing.

10. The head-up display device according to claim 9, wherein the processor:
acquires the display item information at predetermined time intervals, and
specifies, when the travel information has failed to be acquired by the processor after the previous display timing, the display position based on (i) the position of the display item having the movement attribute indicated by the display item information acquired last by the processor and (ii) the correction position of the moving body obtained by correcting the position of the moving body indicated by the travel information acquired last by the processor, the correcting being performed in accordance with the state indicated by the state information of the moving body acquired by the processor, and
displays an image showing the display content related to the display item of the movement attribute indicated by the display item information acquired last by the processor at the display position on the display medium specified when the travel information has failed to be acquired by the processor after the previous display timing.

11. The head-up display device according to claim 9, wherein
the travel information further indicates a traveling direction of the moving body,
the processor acquires the state information at predetermined time intervals, and
when the travel information has succeeded to be acquired by the processor after the previous display timing, the processor specifies the display position of the display content related to the display item of the movement attribute based on (i) the position of the display item having the movement attribute indicated by the display item information and (ii) the position and the traveling direction of the moving body indicated by the travel information acquired last by the processor, and
when the travel information has failed to be acquired by the processor after a previous display timing, the processor specifies the display position of the display content related to the display item of the movement attribute based on (i) the position of the display item having the movement attribute indicated by the display item information acquired last by the processor, and (ii) the correction position and a correction traveling direction of the moving body obtained by correcting the position and the traveling direction indicated by the travel information acquired last by the processor, the correcting being performed in accordance with the state indicated by at least state information of the moving body acquired last by the processor.

12. The head-up display device according to claim 11, wherein the moving body is a vehicle, the state information includes information of a vehicle speed and a steering angle of the vehicle, and when the travel information has failed to be acquired by the processor after a previous display timing, the processor estimates a present position and a present traveling direction of the vehicle based on (i) the position and the traveling direction of the vehicle indicated by the travel information acquired last by the processor and (ii) the vehicle speed and the steering angle indicated by state information acquired by the processor, and determines the correction position and the correction traveling direction of the vehicle to reflect a result of the estimation.

13. The head-up display device according to claim 12, wherein the state information further includes information of a gradient of the vehicle, and the processor estimates a present position and a present traveling direction of the vehicle based on the gradient of the vehicle indicated by the state information.

14. The head-up display device according to claim 9, wherein the processor does not display the image showing the display content related to the display item of the movement attribute when the travel information has failed to be acquired by the processor after a previous display timing and the display position specified is out of a predetermined region on the display medium.

15. The head-up display device according to claim 9, wherein the display item having the movement attribute is at least one of right/left turn mark for guiding pathway to a destination or pedestrian warning mark showing a pedestrian, and the display item having the fixed attribute is at least one of speed meter information showing vehicle speed or rotation speed meter information showing rotation speed of engine.

* * * * *